(12) United States Patent
Kleinsasser

(10) Patent No.: US 6,748,901 B1
(45) Date of Patent: Jun. 15, 2004

(54) PEN AND ATTACHED FEEDING APPARATUS FOR AN ANIMAL

(75) Inventor: Jonathan Kleinsasser, Ste. Agathe (CA)

(73) Assignee: Cryatla Spring Colony Farms Lt., Ste. Agathe (CA)

( * ) Notice: Subject to any disclaimer, the term of this patent is extended or adjusted under 35 U.S.C. 154(b) by 0 days.

(21) Appl. No.: 10/412,665

(22) Filed: Apr. 14, 2003

(51) Int. Cl.[7] ................ A01K 39/01; A01K 39/014
(52) U.S. Cl. ..................... 119/475; 119/57.4
(58) Field of Search ................. 119/475, 476, 119/477, 57.1, 57.4; D30/133, 131

(56) References Cited

U.S. PATENT DOCUMENTS

| | | | | |
|---|---|---|---|---|
| 5,887,543 A | * | 3/1999 | Williams et al. | 119/57.1 |
| 5,964,185 A | * | 10/1999 | DeBonne et al. | 119/57.4 |
| 6,263,833 B1 | * | 7/2001 | Runyan et al. | 119/57.4 |
| 6,390,022 B1 | * | 5/2002 | Eichler et al. | 119/475 |
| 6,435,134 B1 | * | 8/2002 | Ho | 119/477 |
| 6,553,937 B1 | * | 4/2003 | Cheng | 119/477 |

* cited by examiner

*Primary Examiner*—Charles T. Jordan
*Assistant Examiner*—Elizabeth Shaw
(74) *Attorney, Agent, or Firm*—Adrian D. Battison; Michael R. Williams; Ryan W. Dupuis

(57) ABSTRACT

An animal in a pen is fed by a drop tube from a raised supply system to a position at or adjacent the floor or a trough at the floor. A spout at the bottom of the drop tube extends at an angle to the tube for discharging the feed in a direction to one side of the drop tube depending upon an angular orientation of the drop tube about a vertical axis of the drop tube. A clamp for attaching the drop tube to the wall of the pen includes co-operating indexing adjustment components including a stud mounted on the tube and grooves in the top surface of the clamping band which can be adjusted to provide a plurality of indexed angular orientations of the tube about the axis for locating the direction of discharge of the spout at specific indexed locations relative to the trough.

7 Claims, 3 Drawing Sheets

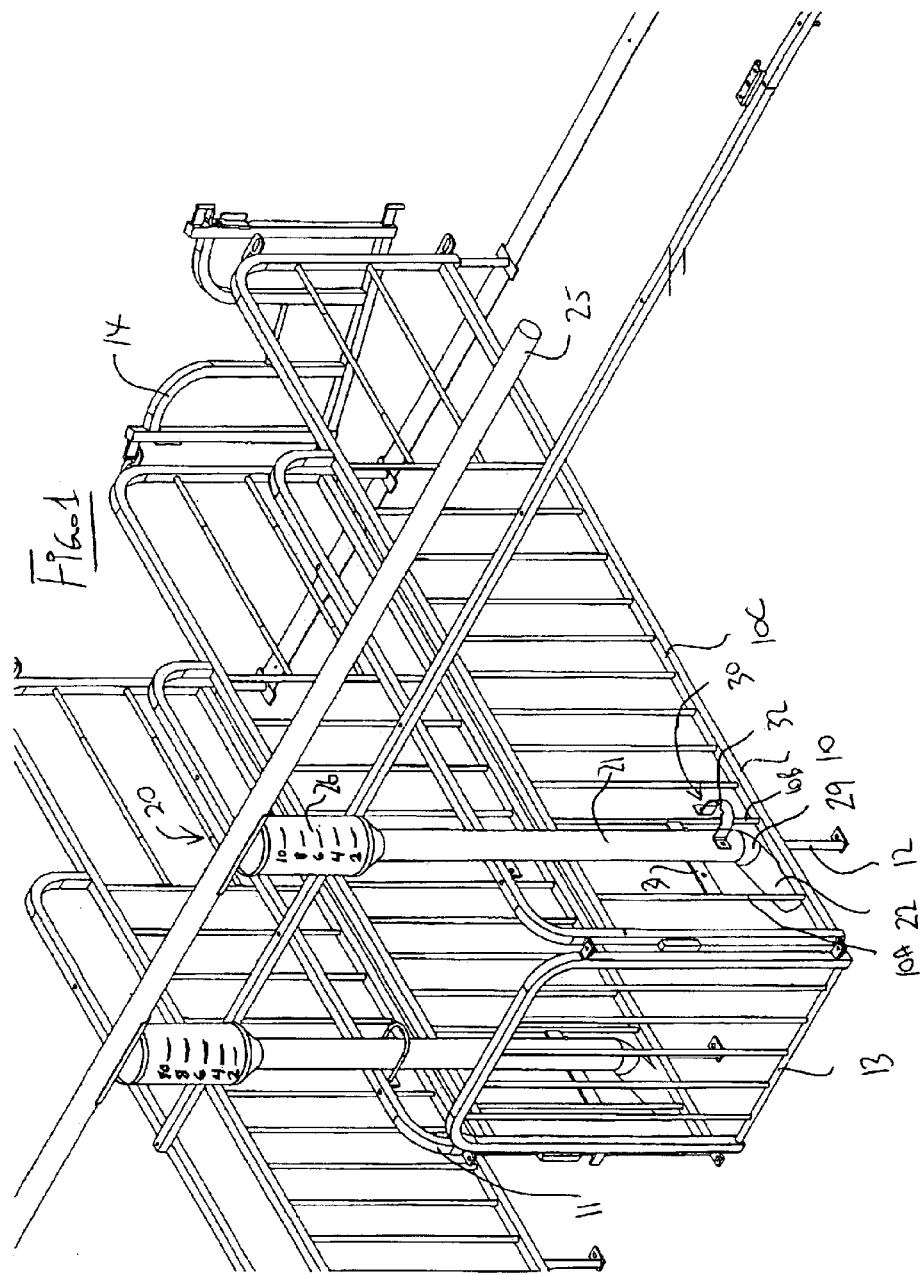

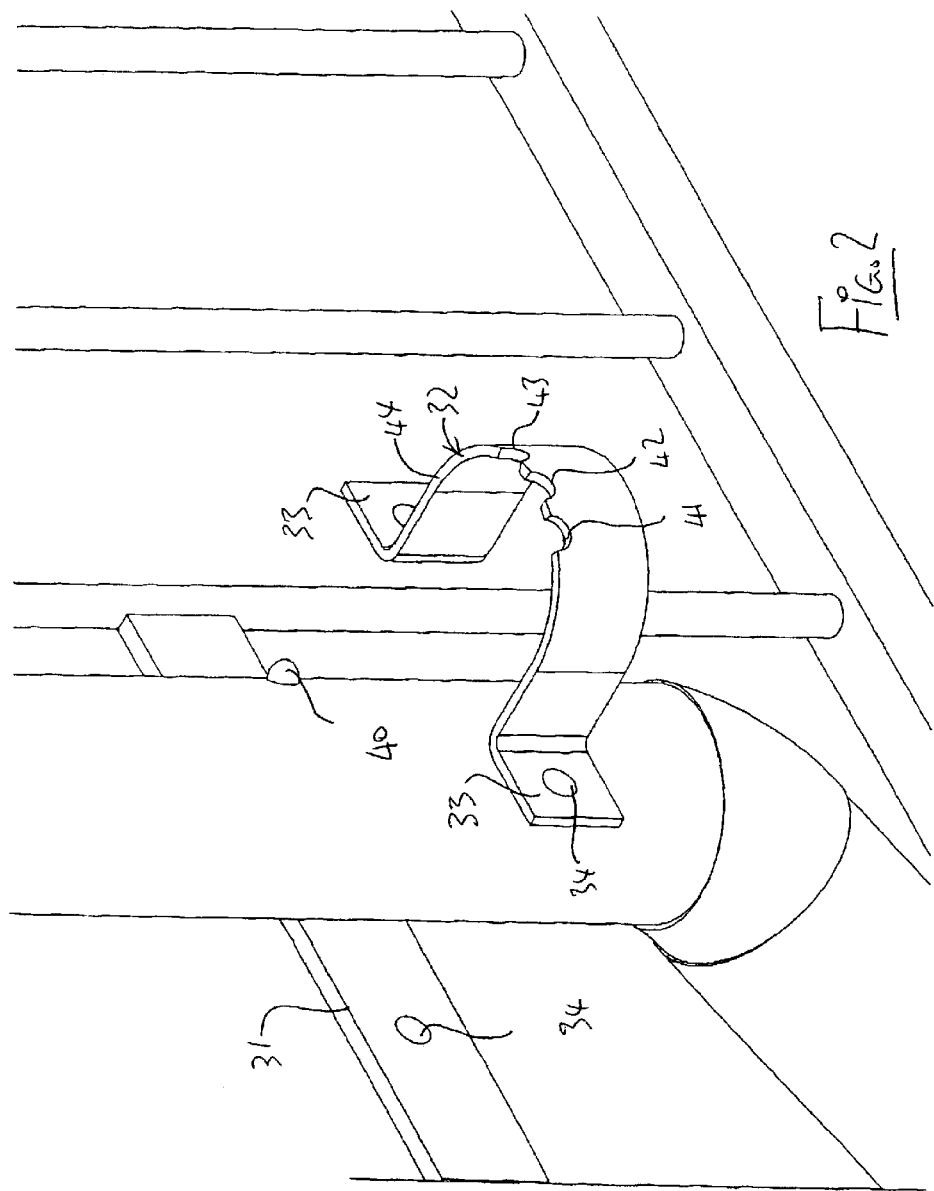

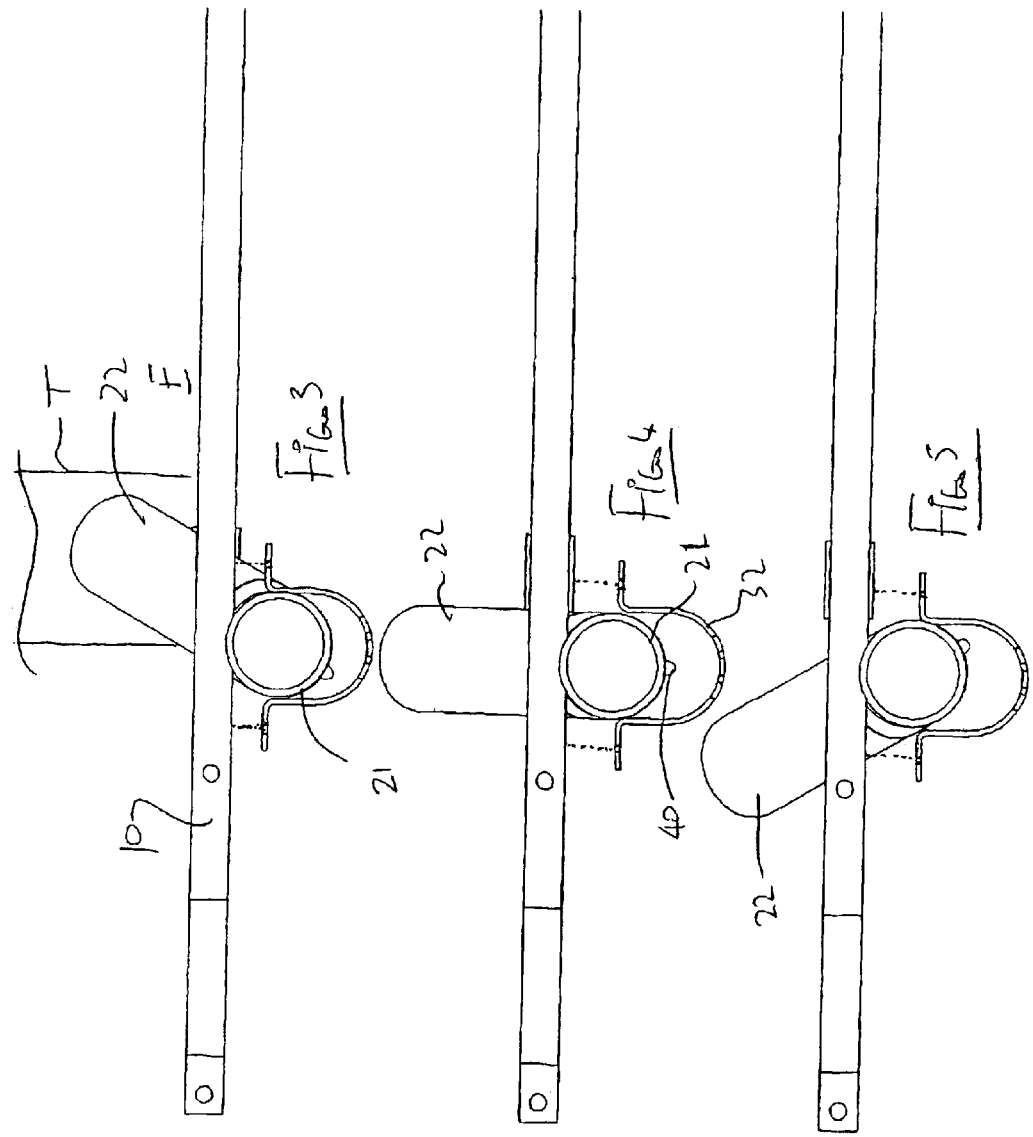

PEN AND ATTACHED FEEDING APPARATUS FOR AN ANIMAL

BACKGROUND OF THE INVENTION

Animals and particularly hogs are contained in pens during various stages of their growth and life. The present invention is particularly concerned with the gestation stalls where a single sow is contained within an individual stall or pen during this particular stage before being moved to a furrowing crate. Such stall generally comprises a row of pen walls which divide each pen from the next with front and rear pen walls which divide the stalls from suitable alleyways for accessing the sows.

It is conventional that feed is supplied to the animal in the stall by a drop tube which extends from the supply above the pens to deposition into the pen at a required location at or adjacent the pen floor. In many cases the feed is deposited directly onto the floor. In other cases the feed is deposited at or into a channel in the floor or a trough at the floor which also contains water.

Other pens use a similar drop tube system for transporting the feed into the pen for taking by the animals.

SUMMARY OF THE INVENTION

It is one object of the invention to provide an improved pen for an animal where the feeding system allows accurate location of the feed relative to the pen wall.

According to one aspect of the invention there is provided an apparatus comprising:

- a pen for containing one or more animals including a pen wall for standing on a floor;
- a feeding assembly for supplying feed to the pen having:
    - a drop tube for transporting feed from a raised supply system to a position at or adjacent the floor;
    - a spout at the bottom of the drop tube for discharging the feed in a direction to one side of the drop tube depending upon an angular orientation of the drop tube about a vertical axis of the drop tube;
    - a clamp for attaching the drop tube to the wall of the pen to hold the drop tube at a predetermined height and at a predetermined angular orientation;
    - and co-operating indexing adjustment components mounted on the clamp and the tube which can be adjusted to provide a plurality of indexed angular orientations of the tube about the axis for locating the direction of discharge of the spout at specific indexed locations.

The term "pen" as used herein is intended to include both pens for multiple animals and individual animals, sometimes called a "stall".

Preferably the tube is located outside the pen wall and the spout projects through the pen wall.

Preferably the clamp comprises a strap on the pen wall and a clamping band wrapped around the tube.

Preferably the co-operating components comprise a projection on the tube and a plurality of receptacles on the band, although other indexing components which can interconnect and a plurality of separate fixed locations can also be used.

In this specific arrangement, the receptacles may comprise indentations in a top edge of the band.

In this specific arrangement, the projection may comprise a stud welded onto one face of the tube.

Preferably the spout comprises a portion of tube attached to the drop tube by an elbow.

BRIEF DESCRIPTION OF THE DRAWINGS

One embodiment of the invention will now be described in conjunction with the accompanying drawings in which:

FIG. 1 is an isometric view of a pen according to the present invention.

FIG. 2 is an exploded expanded isometric view of the feeding apparatus of the pen of FIG. 1.

FIGS. 3, 4 and 5 are exploded expanded side elevational views of the feeding apparatus of the pen of FIG. 1.

In the drawings like characters of reference indicate corresponding parts in the different figures.

DETAILED DESCRIPTION

A pen as shown in FIG. 1 comprises side pen walls 10 and 11 which are attached by legs 12 to a floor on which the animal stands. A front wall 13 spans an open front between the front of the side walls and similarly a rear gate 14 closes a rear opening across the rear of the side walls.

The shape and arrangement of the pen can be varied in accordance with requirements and in accordance with different design characteristics employed by different manufacturers, all as is well known to one skilled in the art. A feed system for feeding particulate feed to an animal within the pen comprises a supply system generally indicated at 20, a drop tube 21 and a spout 22. The supply system 20 is of a conventional nature including a supply duct 25 which supplied feed into a hopper 26 which is adjustable to receive pre-determined amounts of feed from the supply duct 25 in accordance with the an adjustment for the particular animal within the particular stall concerned. Devices of this type are well-known and widely used.

The hopper 2 co-operates with the drop tube 21 which extends from the bottom of the hopper downwardly to a position closely adjacent the floor on which the pen stands.

The drop tube is vertical and has a length sufficient to extend the required distance. The spout 22 is formed at an extension of the tube attached to the tube at a fixed elbow 29 having an angle of the order of 45 degrees. The material from the supply hopper 26 can be discharged at a time selected by the operator so the material stored to the required amount within the supply hopper is discharged into the tube and slides down the tube, into the spout and to a location to one side of the tube 21 determined by the angle of the spout.

The tube 21 is fixed into position by a clamping system 30 which attaches the tube to one side wall of the pen. The clamping system comprises a strap 31 which extends horizontally between two vertical bars 10A and 10B of the side wall 10. The strap 31 is therefore straight and horizontal and engages one side face of the tube 21 which is cylindrical. A band 32 engages around half of the cylinder of the tube and then has legs extending to the strap 31 with flanges 33 which are attached to the strap 31 by bolts passing through aligned holes 34 so as to clamp the band 32 onto the outside of the tube and to hold it against the strap 31 as a tight fit. Thus the tube when clamped is held against rotation in fixed position against the side of the pen. The tube is located on the outside surface of pen with the spout projecting through the wall 10 of the pen underneath strap 31 and above a bottom rail 10C of the side wall 10 so that the end of the spout is located closely adjacent the floor inside the pen.

The angular orientation of the tube 21 around it axis is moveable to three selected indexed positions by rotating the tube about its axis with the clamp loosened and by placing a projection 40 within a selected one of three receptacles 41, 42 and 43 provided at the band. The projection 40 forms a stud or nipple welded onto the outside of the tube at the required height. The receptacles 41, 42 and 43 are formed by recesses formed in a top surface 44 of the band 32. Thus in operation the clamp can be moved to a position where it is not quite tightened allowing the tube to be rotated. The tube can be then slightly raised so that the projection 40 is held out of the receptacles or cups 41, 42 or 43 and the tube can be rotated to the required angular orientation thus selecting one of the receptacles for the projection 40. When located within its receptacle, the projection 40 locates the angular orientation of the tube to one of the three selected indexed positions whereupon the band can be tightened on the strap 31 to clamp the tube in that orientation.

As shown in FIGS. 3, 4 and 5, the three separate indexed positions are shown including a center position shown in FIG. 4 where the spout 22 extends through the side wall 10 at right angles to the plane of the side wall. In FIG. 3 is shown the righthand position where the tube 21 is rotated in a clockwise direction from the center position through angle of the order of 30°. In FIG. 5 is shown the lefthand position where the tube is rotated through an angle of the order of 30° in a counter-clockwise direction.

The tube is arranged to co-operate with a trough T formed in the floor F shown in FIG. 3. In the righthand position shown in FIG. 3 the spout is arranged to discharge the feed directly into the trough T. In the position shown in FIG. 4, the spout is arranged to discharge the material partly into the trough and partly onto the floor behind the trough. In FIG. 5 the spout is arranged to discharge the material wholly onto the floor.

Thus in a simple manner the required orientation of the spout can be selected and maintained during assembly of the pens to set up the required orientation selected by the manager. If it is later required to adjust the feed to an alternative one of the three angular orientations, this can be quickly effected by loosening the strap, rotating the tube and dropping the projection into the required receptacle.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. Apparatus comprising:
    a pen for containing one or more animals including a pen wall for standing on a floor;
    a feeding assembly for supplying feed to the pen having:
        a drop tube for transporting feed from a raised supply system to a position at or adjacent the floor,
        a spout at the bottom of the drop tube for discharging the feed in a direction to one side of the drop tube depending upon an angular orientation of the drop tube about a vertical axis of the drop tube;
        a clamp for attaching the drop tube to the wall of the pen to hold the drop tube at a predetermined height and at a predetermined angular orientation;
        and co-operating indexing adjustment components mounted on the clamp and the tube which can be adjusted to provide a plurality of indexed angular orientations of the tube about the axis for locating the direction of discharge of the spout at specific indexed locations.

2. The apparatus according to claim 1 wherein the tube is located outside the pen wall and the spout projects through the pen wall.

3. The apparatus according to claim 1 wherein the clamp comprises a strap on the pen wall and a clamping band wrapped around the tube.

4. The apparatus according to claim 3 wherein the co-operating components comprise a projection on the tube and a plurality of receptacles on the band.

5. The apparatus according to claim 4 wherein the receptacles comprise indentations in a top edge of the band.

6. The apparatus according to claim 3 wherein the projection comprises a stud welded onto one face of the tube.

7. The apparatus according to claim 1 wherein the spout comprises a portion of tube attached to the drop tube by an elbow.

* * * * *

UNITED STATES PATENT AND TRADEMARK OFFICE
CERTIFICATE OF CORRECTION

PATENT NO. : 6,748,901 B1
DATED : June 15, 2004
INVENTOR(S) : Jonathan Kleinsasser It is certified that error appears in the above-identified patent and that said Letters Patent is hereby corrected as shown below:

Title page,
Item [73], Assignee, should read -- Crystal Spring Colony Farms Ltd. --.

Signed and Sealed this

Eighth Day of March, 2005

JON W. DUDAS
*Director of the United States Patent and Trademark Office*